United States Patent [19]
Riseman

[11] 3,910,607
[45] Oct. 7, 1975

[54] APPARATUS FOR DETERMINING THE CONCENTRATION OF SPECIES

[75] Inventor: John H. Riseman, Cambridge, Mass.
[73] Assignee: Orion Research Incorporated, Cambridge, Mass.
[22] Filed: Feb. 7, 1972
[21] Appl. No.: 224,145

[52] U.S. Cl. .................................. 283/1 A; 33/1 B
[51] Int. Cl.² ........................................... B41L 1/00
[58] Field of Search ...................... 283/1 A; 33/1 B

[56] References Cited
UNITED STATES PATENTS
1,413,973  4/1922  Darville ............................. 283/1 A
1,564,964  12/1925  Knieling........................... 283/1 A X Primary Examiner—Lawrence Charles
Attorney, Agent, or Firm—Robert W. Hagopian, Esq.

[57] ABSTRACT

A special plotting paper for determining the unknown concentration of a sample species in titrations utilizing Nernstian response sensing devices. The paper comprises lines defining a vertical and horizontal axis, a set of parallel vertical lines spaced equally apart, and a set of transverse lines spaced anti-logarithmically apart and skewed with respect to the horizontal axis. The intersection of the vertical lines with the horizontal axis forms a linear scale which represents the volume of titrant added. The intersection of the transverse lines with the vertical axis forms an anti-logarithmic scale which represents the electrode potential of the Nernstian device. The transverse lines are skewed to adjust the potential readings for the fractional change in the volume of sample solution due to the addition of titrant. In a titration, the electrode potential readings of the Nernstian device are plotted versus volume of titrant added. A straight line is fitted through the plotted points and is extrapolated to the horizontal axis. The intercept of the straight line and horizontal axis represents the equivalence point from which the unknown concentration of the sample species is easily determined.

4 Claims, 1 Drawing Figure

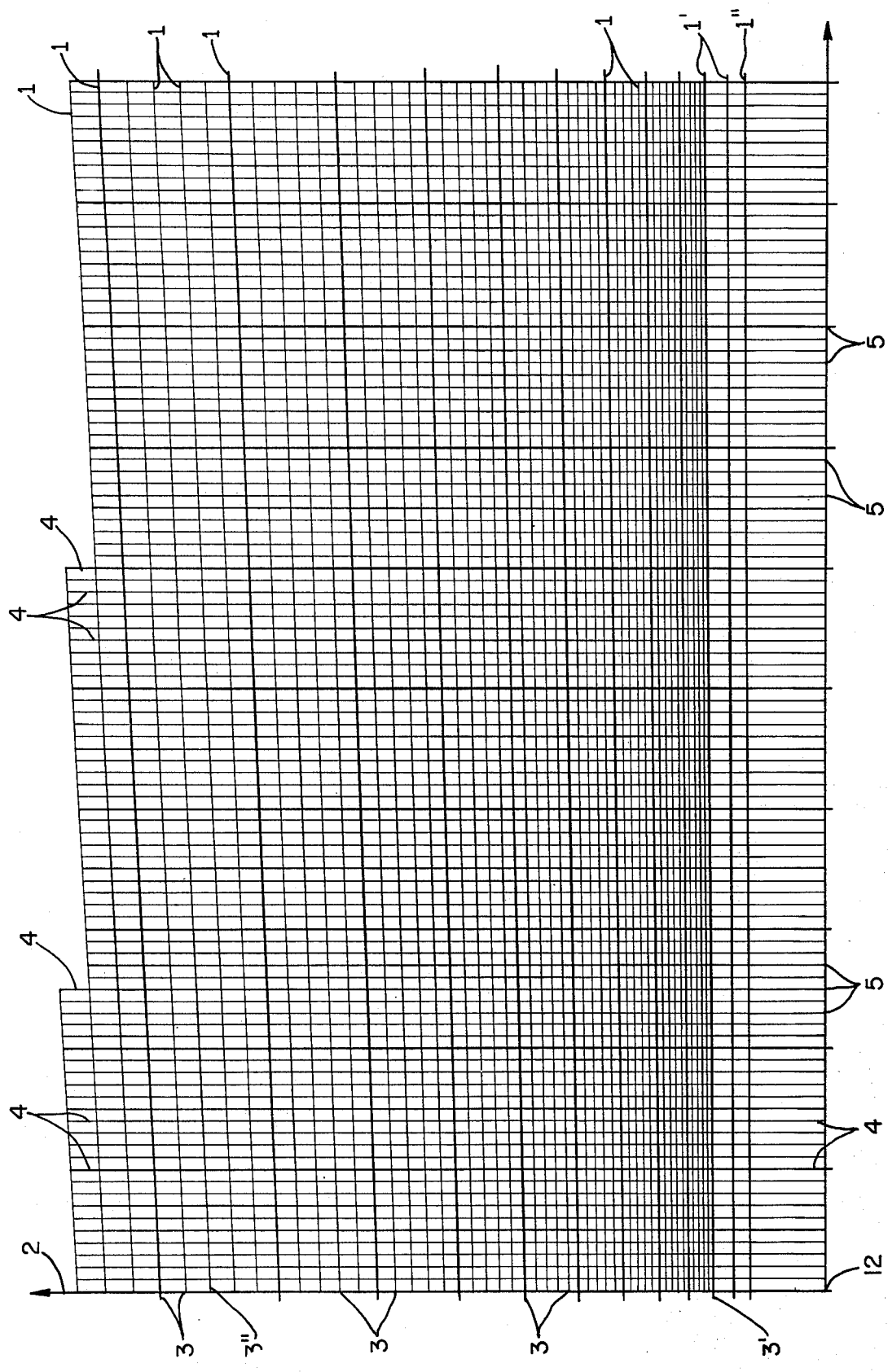

APPARATUS FOR DETERMINING THE CONCENTRATION OF SPECIES

FIELD OF THE INVENTION

This invention relates generally to titration techniques utilizing Nernstian response sensing devices, and more specifically to titrations using specific ion electrodes.

PRIOR ART

Titrations utilizing specific ion electrodes having Nernstian responses have been carried out by adding titrant solution to a sample solution containing an unknown concentration of specie and measuring the potential of an ion electrode selective to the sample or titrant species. Ideally, the plot of electrode potential versus titrant added will yield a sigmodial titration curve wherein the inflection point is considered to be the equivalence point. From a practical viewpoint, ideal curves are frequently not obtainable because of the nature of the reactions utilized in the titrations. For instance, the sample may be dilute enough for appreciable dissociation of a complex to occur, or for the solubility of precipitate formed to be appreciable. Likewise, as the level of the sensed ion decreases, other ions in the solution may interfere. These problems manifest themselves in the titration curve as poor end-point breaks. Besides these inherent problems, there are many drawbacks in the mechanics of the titration. Data for the entire titration curve must be obtained and plotted before the end point can be located. Great care must be taken to avoid overshooting the end point; and near the end point, a large number of points are needed.

Many of these difficulties are eliminated by linear titration plots. In this technique, arbitrary concentration which is proportional to the amount of specie being sensed, is plotted versus the amount of added titrant on ordinary rectilinear graph paper. Initially, given the electrode potential, the activity is determined by solving the well known Nernst equation:

$$E = E_0 + N \log A$$

where E is the electrode potential, $E_0$ is a constant determined by reference electrodes, N is the Nernst factor, and A is the activity of the sensed ion in the total volume of sample solution and titrant. Before plotting, the activity must be adjusted to reflect the fractional increase in the volume of the sample solution due to the volume addition of titrant. This yields the arbitrary concentration or volume-corrected activity. If points are taken in a region where the solubility of the precipitate or dissociation of the complex formed is minimal, a straight line can be fitted approximately to the points. That straight line is extrapolated to the added titrant axis, and the point of intersection is the equivalence point. The foregoing, known as Gran's method, is described more fully by G. Gran, *The Analyst*, Vol. 77, p. 661 (1952), and by Rossotti and Rossotti, *Journal Chem. Ed.*, Vol. 42, p. 375 (1965).

In addition to eliminating the problems associated with sigmodial titration curves, the Gram's technique has the added advantage in that it can be carried out in the region where the error introduced by interfering species is minimal and where the reaction between the sample specie and titrant is most complete. A serious disadvantage of Gran's method is the time consuming calculations necessary to compute the volume-corrected activity from the electrode potential for each reading. Applicant's invention is designed to overcome this problem by providing a device to determine the equivalence point simply and quickly, given the electrode potential readings.

SUMMARY IF INVENTION

The primary object of applicant's invention is to provide a special plotting paper on which the electrode potential readings of a Nernstian sensing device in a titration can be plotted directly versus the volume of titrant added, to yield a linear plot from which the equivalence point may be easily determined.

In accordance with the present invention, applicant provides a special plotting paper having thereon a plurality of indicia or lines including a vertical and horizontal axis (ordinate and abscissa) intersecting at an origin point, a set of vertical lines equally spaced apart, and a set of transverse lines spaced anti-logarithmically apart and skewed with respect to the horizontal axis. The term "paper" is intended to include any web, plane surface or sheet material upon which substantially continuous straight lines can be established. The intersection of the vertical lines with the horizontal axis forms a linear scale which is used to represent volume of titrant added, $V_t$. The intersection of the transverse lines with the vertical axis forms an anti-logarithmic scale which is used to represent the electrode potential readings of a Nernstian sensing device. The slope of each transverse line is different and is equal to the distance between its vertical axis intercept and the origin, divided by the distance along the abscissa corresponding to the volume of sample solution, $V_s$, prior to the addition of titrant.

To use the plotting paper of the invention with a titration, electrode potential readings of a specific ion electrode sensing either the sample specie or titrant are plotted versus the known volume addition of titrant on plotting paper having transverse lines each of which have been established with a slope appropriate to the titration. Points are chosen which have stable electrode potential readings and which are not in a region of appreciable dissociation of the complex or solubility of precipitate formed. The resulting linear fit through those points is extrapolated to the horizontal axis to yield the equivalence point from which the original concentration of the sample specie may be easily calculated.

These and other objects of the invention will become more apparent with the following specification and accompanying drawing herein a 10 percent volume corrected plotting paper embodying the invention.

PREFERRED EMBODIMENT

Referring now to the drawing, there is shown a coordinate system comprising a plurality of straight lines, disposed and related to one another in a novel arrangement. The ordinate or vertical axis 2 and horizontal axis 7 intersect at origin 12. The vertical lines 4 are equally spaced apart and are parallel to one another and the ordinate. Lines 4 intersect the horizontal axis 7 at a set of points 5 which form a linear scale on the horizontal axis. Transverse lines 1 are provided and are spaced anti-logarithmically apart with the distance between adjacent lines 1 increasing exponentially from the origin 12. Thus, the lines 1 intersect the vertical axis 2 at a set of points 3 which form an anti-logarithmic scale on said axis. The slope of each transverse line 1 is equal to the distance from origin 12 to its intercept on vertical axis 2, divided by a factor of ten times the distance between the origin 12 and point 5' on horizontal axis 7.

The scale formed by the points 5 on horizontal axis 7 is intended to represent the known volume of titrant added. For convenience the origin 12 may be taken to represent zero volume of titrant added. Arbitrary values of volume may be assigned to the divisions between adjacent points 5. For example, each division may represent one-tenth milliliter, one milliliter, or two milliliters. This is simple a matter of choice and practicality.

The scale formed by points 3 on the vertical axis 2 is used to represent the electrode potential readings of a specific ion electrode utilized in a titration. Since the activity is proportional to the anti-log of E/N, where E is the potential and N is the Nernst factor, the scale is intended to be representative of activity of the sensed specie. For convenience, the origin 12 can be taken to represent positive infinity volts when an anion electrode is used and negative infinity volts when a cation electrode is used. In both cases, the origin 12 would represent zero activity. An arbitrary value is assigned to one other point to establish the scale of the ordinate. The value in millivolts represented by each division between two adjacent points 3 is easily determined by dividing the Nernst factor, N, by the number of divisions between two points wherein one is onetenth the distance from the origin 12 as the other. For example, in the accompanying drawing, the point 3' is one-tenth the distance from the origin 12 as is point 3'', and there are exactly 58 divisions between points 3' and 3''. Hence each division has a value of N/58 millivolts in the drawing. Additionally, it should be noted that in the accompanying drawing, it is not possible to show all the transverse lines near the horizontal axis 7 as the distance between the lines decreases exponentially towards said axis. Hence, each line 1' represents every fifth transverse line, and each division between adjacent transverse lines 1' represents five of the divisions between adjacent transverse lines 1. Between the transverse line 1'' and the axis 7, no transverse lines are shown as the spacing between them would be too small to illustrate.

It is readily seen how convenient the illustrated plotting paper is for conducting titrations with an electrode having a Nernst factor or slope which is an integral multiple or division of 58. For instance, if N is 58 millivolts, each division represents one millivolt and the readings from a millivolt meter measuring the electrode potential may be easily transposed to the scale formed by points 3 on the vertical axis 2. Likewise, if an electrode has a slope or Nernst factor of X millivolts, use of plotting paper having X (or an integral multiple or factor of X) divisions between two points 3 wherein one is one-tenth the distance from the origin 12 as the other, is desirable. Conversely, one way of constructing a plotting paper with an anti-logarithmic scale having X divisions between two points M and L on the vertical axis 2 wherein M is one-tenth the distance from the origin 12 as L, is to plot points 3 on vertical axis 2, corresponding to the values of the anti-logarithms of M + (L−M) (1,2, . . . X)/X and to construct the transverse lines 1 with appropriate slopes through these points.

As indicated above, the potential scale on the vertical axis 2 is a representation of activity. But, since it is an arbitrary concentration or volume corrected activity that is desired, the ordinate position must be adjusted to reflect the fractional increase in volume of the sample solution due to the addition of titrant. This is accomplished by the transverse lines 1 which are skewed with respect to the horizontal axis 7. More specifically, the slope of each line 1 is equal to the distance between its intercept on the vertical axis 2 and the origin 12, divided by the distance represented by the volume of sample solution $V_s$ on the horizontal axis 7. Accordingly, the ordinate position, and hence the potential or activity, is changed by an amount equal to the slope times the distance represented by the volume of titrant added, $V_t$, or more simply the fractional increase, $V_t/V_s$, in the volume of sample solution due to the addition of titrant.

In the accompanying figure, the ordinate positions of lines 1 corresponding to point 5' on the horizontal axis 7, are 10 percent greater than their respective intercepts on vertical axis 2. The 10 percent change in ordinate position corresponds to a 10 percent fractional increase in volume of the sample solution $V_s$ due to the addition of titrant, $V_t$. The illustrated coordinate system is suitable for use in any titration wherein the volume of titrant $V_t$ which is desired to be added to the sample solution is ten percent of the volume of said sample solution, $V_s$. For example, if one starts with one liter of sample solution and it is desired to add 100 milliliters of titrant, then the distance between the origin 12 and point 5' may be assigned to represent 100 ml., with each division between adjacent points 5 being one ml. Correspondingly, the potential readings at point 5' would be increased ten percent from their values at the origin 12, that is the zero volume added point. The slope of each line 1 is equal to the distance between its vertical axis 2 intercept and the origin 12, divided by the distance on axis 7 corresponding to one liter, i.e., $V_s/V_t$ or 10 times the distance between origin 12 and point 5'.

More generally, if one desires to add $V_t$ liters of titrant to $V_s$ liters of sample solution, $V_t/V_s$ percent volume-corrected graph paper would be appropriate. Such a paper is constructed as follows: a horizontal axis, a vertical axis, a set of vertical lines and a set of points forming an anti-logarithmic scale on the vertical axis are chosen in accordance with the criteria set out above. A convenient point, P, is taken on the horizontal axis to represent $V_t$ liters, whereby the scale on said axis is fixed. Transverse lines are constructed through the set of points on the vertical axis, each line, having a slope equal to the distance from its vertical axis intercept to the origin divided by the distance on the horizontal axis corresponding to $V_s$ liters, i.e., $V_s/V_t$ times the distance between the origin and point P. The resulting graph paper is $V_t/V_s$ percent volume corrected.

Since the ordinate position represents the volume corrected activity which in turn is proportional to the amount of the sample specie or titrant, the plot of the electrode potential readings versus volume of titrant added on the appropriate volume corrected coordinate paper can be approximately fitted by a straight line. Stable readings of potential are preferably taken in a region where the reaction between sample species and titrant is most complete, that is, where the dissociation of the complex or solubility of the precipitate formed is minimal. The fitted line is extrapolated back to the horizontal axis 7, the point of intersection representing the equivalence point. From the latter, the original amount of sample specie in the given sample may be easily determined.

Another useful application of applicant's paper is its use in performing known addition techniques. Here, known additions of the specie to be measured may be added as "titrant". Electrode potentials are plotted on the paper versus amount of specie added and the best straight line is constructed. Its intersection with the horizontal axis 7 again determines the original amount of specie.

The appended claims are intended to cover all embodiments of applicant's invention with all modifications and changes which occur to these skilled in the art as fall within the spirit of the invention.

What is claimed is:

1. A special plotting paper for determining the unknown concentration of a chemical specie in a titration in which a volume of titrant, $V_t$, is added to a volume of sample specie, $V_s$, which titration employs a Nernstian-responsive chemical sensing electrode responsive, with a slope N, to a chemical specie involved in said titration, said paper comprising:
   a. means for defining a plane surface;
   b. a line on said surface and defining an abscissa;
   c. a line on said surface defining an ordinate intersecting said abscissa at an origin;
   d. a plurality, P, of vertical lines on said surface spaced equally apart and intersecting said abscissa at a set of points to form a scale of P divisions on said abscissa; and
   e. a plurality of lines distributed on said surface transversely to said vertical lines and spaced antilogarithmically apart with the distance between adjacent transverse lines increasing exponentially from said abscissa, said plurality of transverse lines intersecting the ordinate at a set of points which form an anti-logarithmic scale, each transverse line having a slope equal to the distance between its ordinate intercept and the origin, divided by the distance of P divisions times $V_s/V_t$.

2. A special plotting paper as recited in claim 1 wherein there are N transverse lines intersecting the ordinate between two points wherein one point is one-tenth the distance from the origin as the other.

3. A special plotting paper as recited in claim 1 wherein there are an integral multiple of N transverse lines intersecting the ordinate between two points wherein one point is one-tenth the distance from the origin as the other.

4. A special plotting paper as recited in claim 1 wherein there are an integral submiltiple of N transverse lines intersecting the ordinate between two points wherein one is onetenth the distance from the origin as the other.

* * * * *